United States Patent [19]
Abarr et al.

[11] Patent Number: 5,430,625
[45] Date of Patent: Jul. 4, 1995

[54] ILLUMINATION SYSTEM FOR ENHANCED CONTROL OF VEHICLES

[76] Inventors: Larry D. Abarr, P.O. Box 7076, St. Joseph, Mo. 64507; William H. McKnight, Jr., P.O. Box 731, Warrensburg, Mo. 64093

[21] Appl. No.: 196,593

[22] Filed: Feb. 14, 1994

[51] Int. Cl.⁶ .............................................. B60Q 1/26
[52] U.S. Cl. ...................... 362/80; 362/251; 362/293; 362/307; 362/367; 340/431; 340/475
[58] Field of Search ............... 340/431, 471, 472, 473, 340/475, 687; 315/77, 200 A; 362/61, 80, 83, 83.3, 251, 293, 307, 328, 332, 367

[56] References Cited

U.S. PATENT DOCUMENTS

| | | | |
|---|---|---|---|
| 2,517,173 | 8/1950 | Blasingame | 340/470 |
| 3,440,415 | 4/1969 | Spiteri | 362/61 |
| 3,711,704 | 1/1973 | Spiteri | 362/337 |
| 3,766,373 | 10/1973 | Hedgewick | 362/235 |
| 3,887,093 | 6/1975 | Howell | 414/532 |
| 4,024,497 | 5/1977 | Ruppel et al. | 340/431 |
| 4,086,479 | 4/1978 | Andrew | 362/432 |
| 4,091,442 | 5/1978 | Markey | 362/61 |
| 4,091,443 | 5/1978 | Ohrenstein | 362/156 |
| 4,106,081 | 8/1978 | Turturici | 362/61 |
| 4,123,746 | 10/1978 | DuRocher | 340/475 |
| 4,297,675 | 10/1981 | Rubottom et al. | 340/431 |
| 4,319,764 | 3/1982 | Whitaker | 280/154 |
| 4,319,765 | 3/1982 | Rosenbaum | 280/765 |
| 4,800,471 | 1/1989 | Lippert | 362/80 |
| 4,839,776 | 6/1989 | Grossnickle | 362/31 |
| 4,903,173 | 2/1990 | Mochizuki | 362/66 |
| 4,903,174 | 2/1990 | Busby | 362/61 |
| 4,947,293 | 8/1990 | Johnson et al. | 362/32 |
| 5,051,721 | 9/1991 | Harrison | 340/475 |
| 5,099,222 | 3/1992 | Campagna | 340/475 |
| 5,119,278 | 6/1992 | Watson | 362/80 |
| 5,209,559 | 5/1993 | Ruppel | 362/80 |

*Primary Examiner*—Ira S. Lazarus
*Assistant Examiner*—Alan B. Cariaso
*Attorney, Agent, or Firm*—Litman, McMahon & Brown

[57] ABSTRACT

An illumination system for a semi-tractor and trailer includes a pair of illumination housings, one attached to either side of the trailer just above the rear wheels. A reflector within each housing reflects light from a light source downward and outward through a clear lens to encompass an arc extending from the vertical to a predetermined angle, e.g. approximately 45 degrees from vertical. Light is thus directed onto the pavement and any objects immediately adjacent the trailer rear wheels to aid the driver in close quarter maneuvering, turns, and when changing highway lanes. A control circuit is connected to each light source and to the turn signal lead on the respective trailer side to provide steady power to the light source only when the turn signal and/or emergency flasher circuit is enabled. An optional amber lens can be provided on the side of each illumination housing to resemble the ordinary running lights on a typical semi-trailer.

8 Claims, 1 Drawing Sheet

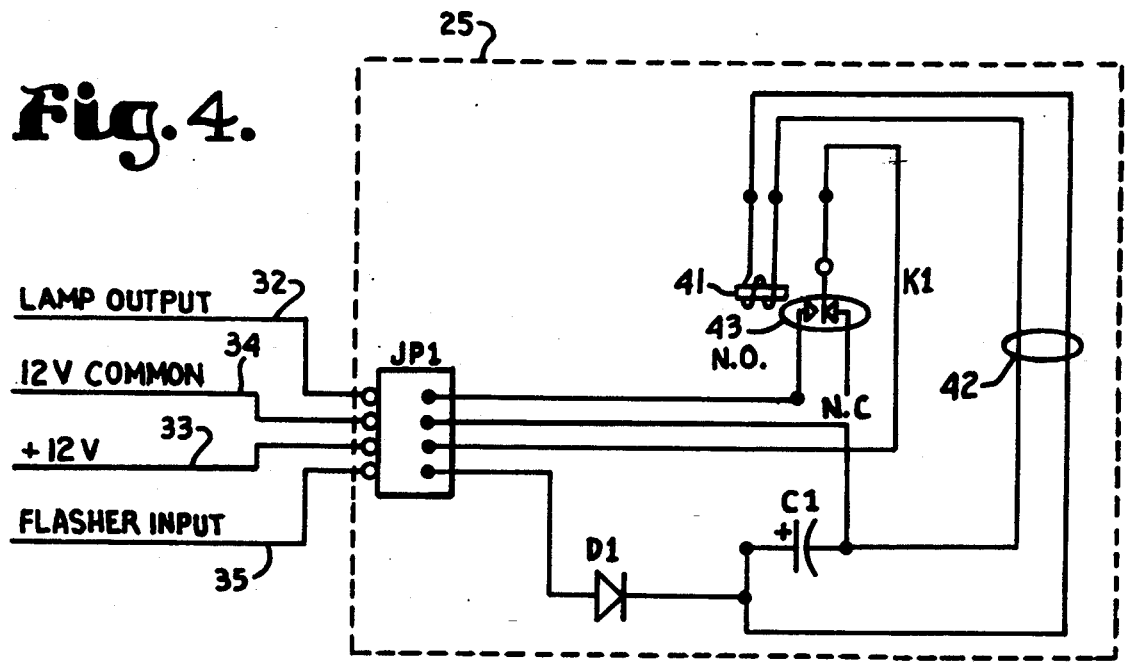
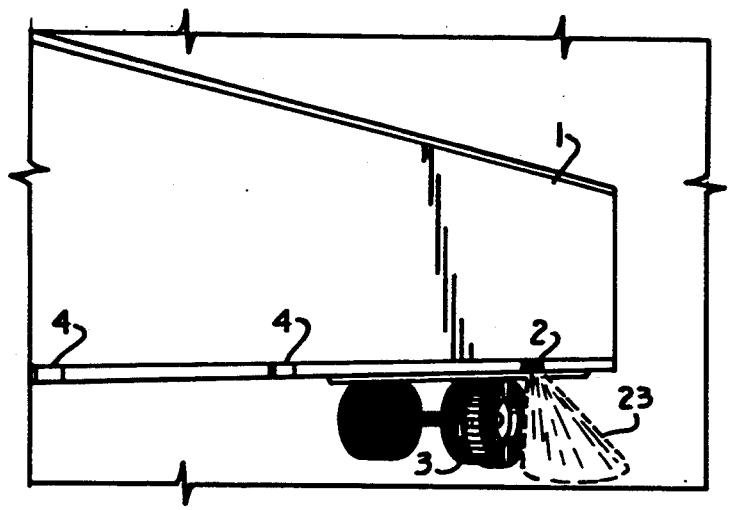
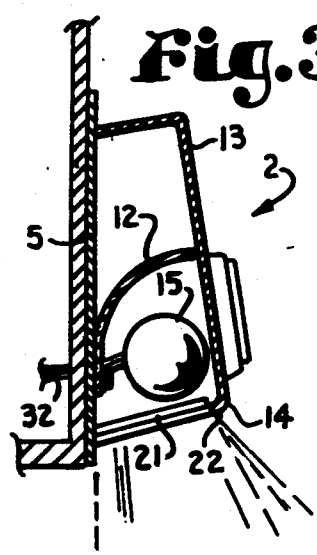
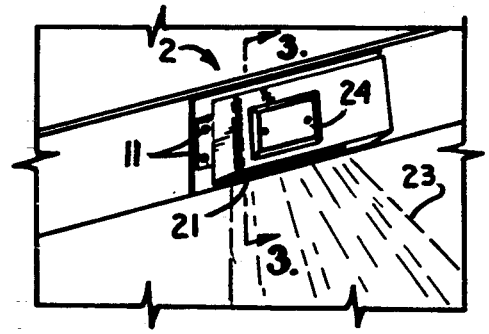

ILLUMINATION SYSTEM FOR ENHANCED CONTROL OF VEHICLES

BACKGROUND OF THE INVENTION

The invention relates to an illumination system for mounting on relatively long or hinged vehicles such as semi-trailers with tractors, articulating vehicles, 5th wheel trailers, buses, recreational vehicles and boat trailers for example. Hereinafter, for convenience, the invention will be described with relation to a semi-tractor and semi-trailer.

Semi-tractor and trailer rigs are difficult to maneuver in close quarters such as city streets and loading docks. Due to the extended fixed length of the semi-trailer, when pivotally connected to a tractor, wide radius turns are necessary. The driver of a semi-tractor must generally rely exclusively on outside rear view mirrors to view the area immediately beside the trailer while making a turn. When such semi-tractors and trailers are traveling straight on a road or highway, outside rear view mirrors are generally satisfactory, even at night, in providing such a view.

However, when the driver is turning or otherwise maneuvering the semi-trailer in close quarters, such as in city streets or near loading docks, and particularly at night, it is impossible for the driver to view the area around the rear trailer wheel. Since the length of the turning radius of the semi-tractor and trailer rig is dependent upon the position of the rear trailer wheel, this inability to adequately see the area around the rear trailer wheel often results in collisions between the side of the trailer and nearby objects or vehicles. In addition to the problems with close quarter maneuvering, to safely complete the act of changing lanes on a multi-lane highway, a driver needs to be able to see any objects which are adjacent the side of the trailer.

One method of dealing with the problem during close quarter maneuvering is for the driver to make a series of small incremental moves, each one of a few feet. With each move, the driver must get out of the tractor to check the progress. These steps are repeated many times until the trailer is satisfactorily turned past any close quarter objects. While this method is often instructed by trucking companies, and is considered mandatory by the Department of Transportation, it is seldom used by drivers for reasons of inconvenience and time consumption. Of course, the method is not available to a driver while changing lanes on a highway. Instead, the "best guess" method is often used where the driver simply uses the extremely limited visual information available from the driver's seat and guesses the location of the trailer relative to his surroundings. Needless to say, this method results in many unnecessary incidents and accidents.

It is clear then, that a safe and reliable illumination system for lighting the area immediately adjacent the rear wheel of a semi-trailer is needed for enhanced safety. Such an illumination system should light the pavement and any objects around the rear trailer wheel during turns or lane changes so that the driver is made aware of the proximity of the trailer relative to surrounding objects. At the same time, to avoid distracting the truck driver and the drivers of surrounding vehicles, such an illumination system should preferably be turned on only when needed.

SUMMARY OF THE INVENTION

The present invention is an illumination system for mounting on either side of a semi-trailer near the rear wheels thereof. The system includes a light source positioned within a housing attached to each side of the truck. A bottom portion of the housing includes a clear lens and a reflector. The reflector is positioned behind the light source and directs light from the light source through the clear lens and onto the pavement and any objects positioned immediately adjacent to the rear of the trailer. Light is directed by the reflector through the clear lens through an arc encompassing a vertical angle downward through a predetermined angle from the vertical, e.g. 45 degrees.

The light source is connected to the turn signal and emergency blinker indicator switches via a circuit including a relay which is kept constantly energized by a capacitor connected to the turn signal power lead. When the associated turn signal or emergency flasher switch is engaged, voltage to the turn signal power lead is intermittently supplied via a flasher circuit in a conventional fashion. The intermittent power keeps the capacitor charged which, in turn, holds the relay energized. A normally open relay contact supplies power to the light source, thus providing constant illumination to the critical area. When the turn signal or emergency flasher switch is turned off, the capacitor is discharged, causing the relay to drop out and the light source to go out.

The housing can be designed to resemble the ordinary "running lights" on a typical semi-trailer which provide illumination for the trailer sides and any indicia thereon. The housing can include an additional colored lens directing light outward so as to perform the additional function of a running light.

OBJECTS AND ADVANTAGES OF THE INVENTION

The principal objects of the present invention are: to provide an improved illumination system for a semi-trailer or the like; to provide such a system which includes a pair of illumination housings attached to respective sides of the trailer; to provide such a system in which the housings are attached near the rear wheels of the trailer with each housing including a respective light source, a reflector directing light from the source downward and outward and a clear lens positioned on the bottom of the housing to allow light from the source to encompass an arc extending from vertical to approximately 45 degrees from vertical; to provide such a system in which the light source is controlled by a circuit connected to associated conventional turn signal and emergency flasher switches on the semi-tractor; to provide such a system in which the controlling circuit causes the light source to be continuously on while the turn signal switch is enabled and to be turned off when the turn signal switch is disabled; to provide such a system in which the housings resemble ordinary running lights; and to provide such a system which enhances safety, provides illumination of objects immediately adjacent a semi-trailer during maneuvering, which is reliable and inexpensive to manufacture and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of the rear portion of a semi-trailer including an illumination system according to the present invention.

FIG. 2 is an enlarged, perspective view of one illumination housing as mounted on the semi-trailer of FIG. 1 and illustrating a downwardly directed arc of light.

FIG. 3 is an enlarged cross sectional view of the housing of FIG. 2, taken along line 3—3 of FIG. 2 and illustrating the position of a light source, reflector and clear lens and showing the angle encompassed by the arc of light.

FIG. 4 is an electrical schematic of an illumination control circuit connected to a flasher input from a conventional turn signal and emergency flasher switch.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limited, but merely as a basis for the claims and as a representative basis for teaching one skilled in the art to variously employ the present invention in virtually any appropriately detailed structure.

Referring to FIG. 1, an improved illumination system for a semi-trailer 1 includes a pair of illumination housings 2, of which only one is shown in FIG. 1. Each housing 2 is attached to the trailer 1 and positioned near the bottom thereof immediately above the rear wheels 3 of the trailer 1. Each housing 2 can resemble a typical running light 4, of which there are two additional ones shown in FIG. 1.

Referring to FIGS. 2 and 3, the housing 2 is shown in more detail, it being understood that the housing on the opposite side of the trailer 1 would be a mirror image thereof. The housing 2 includes a mounting plate 5 which is attached to the trailer 1 via screws 11. Within the housing 2, an arcuate reflector 12 is attached between the plate 5 and an outer side 13 of a five sided enclosure 14. A light source 15, which may be an ordinary 12 volt light bulb, is positioned within the housing 2 below the reflector 12. A clear lens 21 forms a portion of a bottom side 22, with the lens 21 permitting light from the source 15, as reflected by the reflector 12, to exit the housing 2 in a downward arc of light 23. The five sided enclosure 14 is attached to the plate 5 such that the bottom side 22 of the enclosure 14 (and therefore the clear lens 21) extends at an upwardly directed angle away from the side of the trailer 1, which permits the reflected light to form the downward arc 23 at the predetermined outwardly and downwardly directed angle. The arc of light 23 can encompass, for example, an angle which extends from vertical to approximately 45 degrees from the vertical so as to effectively illuminate the pavement and any objects immediately adjacent to the trailer wheels 3. An amber colored lens 24 can form a portion of the outer side 13 to enhance the resemblance of the housing 2 to a running light 4, with some light from the source 15 also being directed through the lens 24.

This arc of illumination is only needed when the trailer 1 is being maneuvered in close quarters, or when changing lanes, and, if the light were on constantly, it would be a distraction to the driver and the drivers of any surrounding vehicles. Therefore, the light source 15 is controlled via a circuit 25, illustrated in schematic form in FIG. 4.

The circuit 25 includes a jumper 31, labeled JP1, which is a removable connection to a lamp power output lead 32, a 12 volt power source lead 33, a common lead 34, and an input flasher lead 35 from an associated turn signal switch (not shown). The circuit 25, when an intermittent voltage is input over the flasher input 35, as when the associated turn signal switch is enabled, charges a capacitor C1 via a diode D1. The capacitor C1 is linked in series with a coil 41 of a relay K1 via a lead pair 42. When the capacitor C1 is charged, voltage is provided across the relay coil 41, causing current to flow through the coil 41. The thus energized coil 41 causes a normally open relay three pole switch 43 to close, connecting the lamp output lead 32 to the power source lead 33 and causing the light source 15 to illuminate. So long as the flasher input is supplying intermittent voltage via lead 35, the relay coil 42 will be constantly energized via the capacitor C1 and the light source 15 will be steadily illuminated. Shortly after the turn signal or emergency flasher switch is turned off and the intermittent flasher voltage ceases on lead 35, the capacitor C1 will discharge, deenergizing the relay coil 41 and disconnecting the lamp lead 32 from the power lead 33, thus turning off the light source 15.

With the inventive illumination system, light is reliably provided to illuminate the pavement and any immediately adjacent objects during lane changing and turning operations by simply turning on the associated turn signal light, an action normally taken by the driver anyway. In close quarter maneuvering, by enabling the emergency flasher circuit, illumination is provided on both sides of the trailer 1. By contrast, when no illumination is needed, as when the trailer is being towed straight on a roadway, if the turn signal and emergency switches are off, no distracting illumination arc will be provided.

While the housing 2 has been illustrated as including a single light source 15, should a constant running light be desired at the same position, a second bulb could be positioned in the housing 2 but above the reflector 12 with the second bulb enabled with the remaining running lights 4 to direct light out of the amber lens 24.

It is to be understood that while certain forms of the present invention have been illustrated and described herein, it is not to be limited to the specific forms or arrangement of parts described and shown.

What is claimed and desired to be secured by Letters Patent is as follows:

1. An illumination system for a semi-trailer or the like comprising:
   (a) a first illumination housing attached to an outboard side of the trailer;
   (b) a second illumination housing attached to an opposite outboard side of said trailer;
   (c) a light source positioned within each said housing;
   (d) light directing means within each housing for directing light from said light source through a downwardly and outwardly directed arc of illumination immediately adjacent the respective trailer side, each said light directing means comprising:
  (i) an arcuate reflector for reflecting light from said light source in a downward direction; and
  (ii) a lens positioned on a bottom side of said housing to allow the reflected light to form said downward arc; and
(e) circuit means for controlling each said light source to provide constant illumination of said arc while an associated turn signal switch is turned on, and to turn off each light source when the associated turn signal switch is turned off without regard to the on/off condition of running lights on the remainder of the vehicle.

2. An illumination system as in claim 1, wherein each said housing is attached to the semi-trailer such that said bottom side and said lens extends upward and outward at an angle from the respective side of said trailer such that said arc of illumination is directed outwardly and downwardly at a predetermined angle.

3. An illumination system as in claim 2, wherein each said housing is attached to the respective side of said trailer above and proximate a rear wheel thereof.

4. An illumination system as in claim 1, wherein each said circuit means comprises:
  (a) a capacitor connected to a flasher lead from said associated turn signal;
  (b) a switch connected in series with said capacitor;
  (c) a normally open contact of said switch which is operative, when said switch is energized, to connect a light source power lead to a constant power source.

5. An illumination system for a semi-trailer or the like comprising:
  (a) a first illumination housing attached to an outboard side of the trailer proximate a rear wheel thereof;
  (b) a second illumination housing attached to an opposite outboard side of said trailer proximate an opposite rear wheel;
  (c) a light source positioned within each said housing;
  (d) light directing means within each housing for directing light from said light source through a downwardly and outwardly directed arc of illumination immediately adjacent the respective trailer side, each said light directing means comprising:
    (i) an arcuate reflector for reflecting light from said light source in a downward direction; and
    (ii) a lens positioned on a bottom side of said housing to allow the reflected light to form said downward arc; and
  (e) circuit means for controlling each said light source to provide constant illumination of said arc while an associated turn signal switch is turned on, and to turn off each light source when the associated turn signal switch is turned off without regard to the state of lights on the remainder of the vehicle, said circuit means comprising:
    (i) a capacitor connected to a flasher lead from said associated turn signal;
    (ii) a switch connected in series with said capacitor;
    (iii) a normally open contact of said switch being operative, when said switch is energized, to connect a light source power lead to a constant power source.

6. An illumination system as in claim 5, wherein each said housing is attached to the respective side of said trailer above and proximate a rear wheel thereof.

7. An illumination system as in claim 5, and further comprising:
  (a) a colored lens positioned in a side of each said housing such that light from the respective light source also shines through said colored lens.

8. An illumination system for a semi-trailer or the like comprising:
  (a) a pair of illumination housings, each of which is attached to a respective outboard side of the trailer above and proximate a rear wheel thereof, each said housing being attached such that a bottom side thereof extends at an upward angle away from the respective side of said trailer;
  (b) a light source positioned within each housing;
  (c) reflector means in each said housing for reflecting light from said light source in a downward and outward direction;
  (d) lens means positioned on the bottom of said housing to allow the reflected light to form a downwardly and outwardly directed arc of illumination;
  (e) a pair of control circuit means for controlling respective ones of said light sources to provide constant illumination of said arc while an associated turn signal switch is turned on, and to turn off the respective light source when the associated turn signal switch is turned off, each said control circuit means comprising:
    (i) a capacitor connected to a flasher lead from said associated turn signal;
    (ii) a relay with a coil connected in series with said capacitor; and
    (iii) a normally open contact of said relay which is operative, when said relay coil is energized, to connect a light source power lead to a constant power source.

* * * * *